(12) United States Patent
Elizondo et al.

(10) Patent No.: US 6,517,881 B2
(45) Date of Patent: Feb. 11, 2003

(54) METHOD FOR REMOVING SKINS FROM A FOOD PRODUCT

(75) Inventors: Rey A. Elizondo, Fresno, CA (US); Andrew Prins, Madera, CA (US)

(73) Assignee: FMC Corporation, Chicago, IL (US)

( * ) Notice: Subject to any disclaimer, the term of this patent is extended or adjusted under 35 U.S.C. 154(b) by 91 days.

(21) Appl. No.: 09/819,161

(22) Filed: Mar. 27, 2001

(65) Prior Publication Data

US 2002/0142084 A1 Oct. 3, 2002

(51) Int. Cl.$^7$ ................................ A23N 7/00
(52) U.S. Cl. ................... 426/482; 426/506; 426/520
(58) Field of Search ......................... 426/506, 481, 426/482, 520; 99/584

(56) References Cited

U.S. PATENT DOCUMENTS

| | | | | |
|---|---|---|---|---|
| 3,396,769 A | * | 8/1968 | Hirahara | 426/482 |
| 3,873,753 A | * | 3/1975 | Nelson et al. | 426/506 |
| 4,101,682 A | | 7/1978 | Kunz | 426/482 |
| 4,707,372 A | | 11/1987 | Catelli | 426/482 |
| 5,682,812 A | | 11/1997 | Dahl et al. | 99/584 |
| 6,056,987 A | | 5/2000 | Frenkel et al. | 426/482 |

OTHER PUBLICATIONS

FMC Corporation "SP–20 Steam Peeler System" brochure, 1993.
FMC Food Tech "Tomato Peeling System" brochure.
Floros, et al., "Microstructural Changes During Steam Peeling of Fruits and Vegetables" *Journal of Food Science*, pp. 849–853, vol. 53. No. 3. 1988.
FMC Food Tech "Tomato Preparation Systems" brochure.

* cited by examiner

*Primary Examiner*—George C. Yeung
(74) *Attorney, Agent, or Firm*—Dorsey & Whitney LLP

(57) ABSTRACT

An apparatus for removing skins from a food product (11), such as produce or fruit, including a pressure vessel (14) formed to contain a volume of superheated water (41) for immersion of the food product, a discharge valve (51) positioned for receipt of superheated water (41) and food product (11) together from the pressure vessel (14). The discharge valve (51) is further formed for separation of superheated water (41) from the food product (11) prior to discharge of the food product into a skin removal device (61). Preferably the skin removal device (61) is a rotary valve which applies both steam and vacuum to the food product to effect flashing of the moisture under the loosened skins to produce peeling. A retrofittable discharge valve (51) is disclosed, as is a method for removing skins from food product (11).

3 Claims, 2 Drawing Sheets

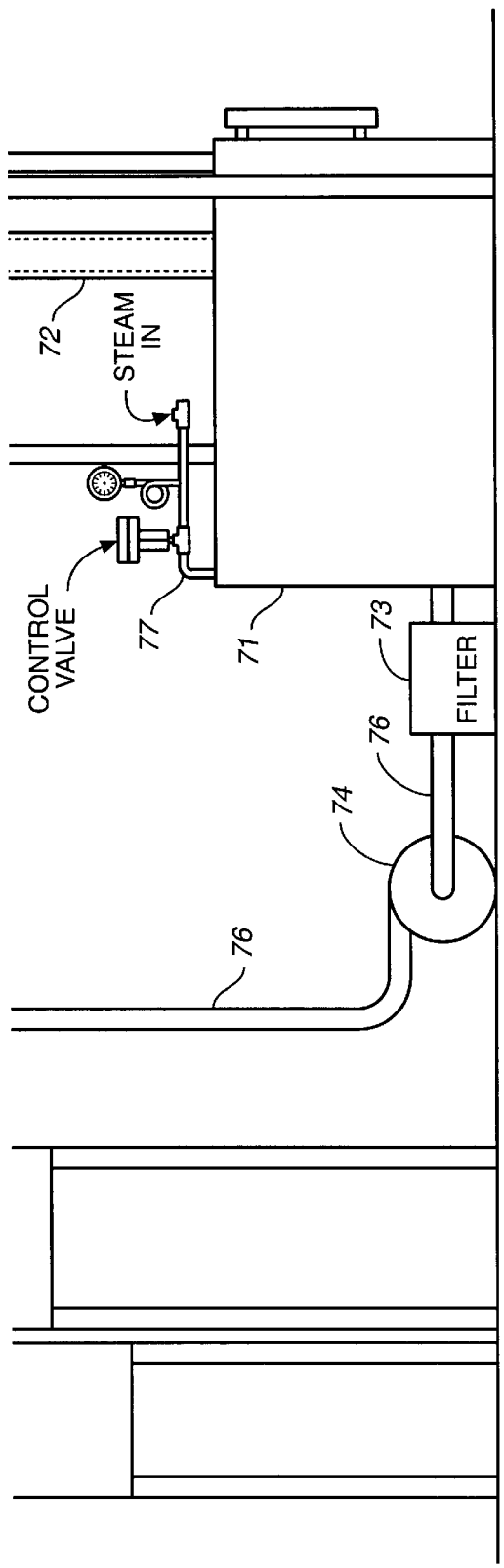
FIG._3
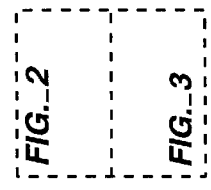
FIG._1

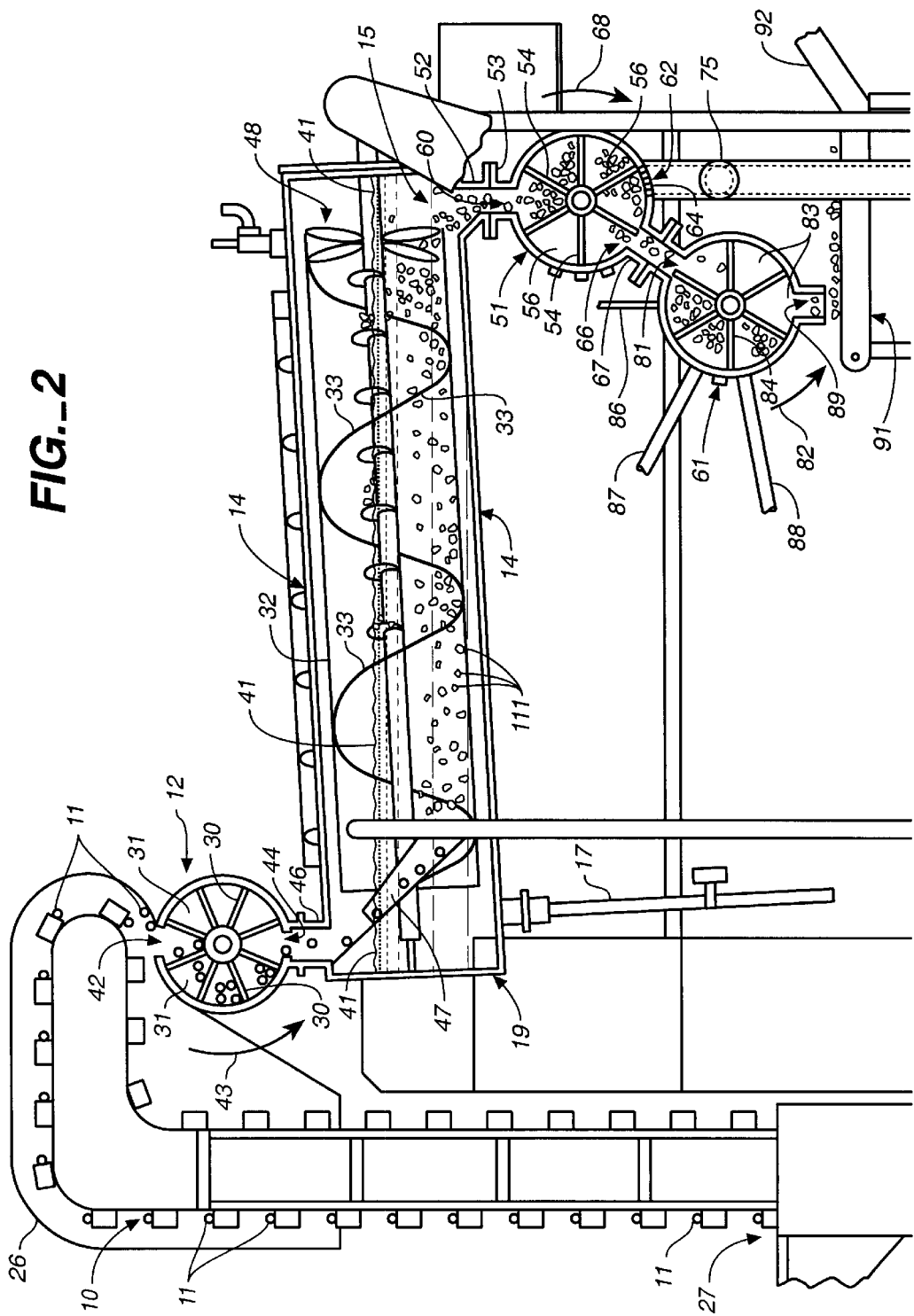

METHOD FOR REMOVING SKINS FROM A FOOD PRODUCT

BACKGROUND ART

The present invention relates, in general, to water, superheated water and steam peelers for food products, and more particularly, relates to methods and apparatus for superheated water peeling of food products such as tomatoes.

BACKGROUND OF THE INVENTION

Superheated steam peelers are in widespread for peeling tomatoes and other fruit, produce or food products. U.S. Pat. Nos. 6,056,987, 5,682,812, 4,707,372 and 4,101,682 are all directed to steam peelers for fruit or produce. U.S. Pat. Nos. 6,056,987 and 5,682,812 describe systems which are being commercially exploited by FMC Corporation to peel tomatoes, and such systems are also described in an FMC Corporation brochure entitled "SP-20 Steam Peeler System."

In superheated tomato steam peeling systems, the pressure vessel employed is typically a drum that is slightly inclined so that condensing steam in the drum will drain away from the tomato discharge valve from the pressure vessel. A drum with internal auger or screw is provided in the pressure vessel to convey the tomatoes from one end of the pressure vessel to the upwardly inclined discharge end of the vessel, while steam condensate gravitates to the lower or inlet end of the pressure vessel. This allows the discharge valve at the upper end to receive steam treated fruit with loosened skins without also discharging condensate with the tomatoes. Once the tomatoes are discharged from the pressure vessel, they typically will be vacuum peeled. If significant condensate is also discharged with the tomatoes, vacuum peeling will produce inconsistent results as the condensate flashes under the negative pressure, rather than moisture under the loosened skins.

Peeling of produce, and particularly tomatoes, using superheated water has also been employed. A commercially exploited system has been introduced to the United States which is sold by FMC Corporation under the trademark SATURNO. A brochure distributed by FMC Corporation describing this system is entitled "FMC Food Tech-Tomato Peeling System" and is incorporated herein by reference. In the SATURNO peeler system, superheated water is used, rather than superheated steam, because it increases heat transfer to the produce to enable greater peeling efficiency and allow higher throughputs.

In the SATURNO system, however, two ferris wheel-type drums are employed in the pressure vessel. A first carries the tomatoes down into the superheated water and then transfers them into a second compartment. The second ferris wheel-type drum raises the tomatoes into an upper steam portion of the pressure vessel for final heating and discharge at a position above the water level.

Hot water at atmospheric pressure also has been employed to loosen the skins of tomatoes for peeling. Existing hot water peelers, however, operate at temperatures of up to only 212° F. After heating in the water, the tomatoes, which are not in a pressure vessel, are removed from the water into a discharge valve and exposed to steam at elevated pressure for a short period of time while in the discharge valve. The tomatoes are then peeled using a vacuum. Because of the limited time in which the skins can be exposed to pressurized conditions, hot water peeling encounters efficiency and throughput difficulties, particularly in connection with peeling late maturing varieties of tomatoes.

The use of pressurized superheated water peelers overcomes the problems of atmospheric hot water peelers in that the food product is immersed or submerged in water which typically has a temperature of about 235–240° F., but may have a temperature as high as 270° F. Superheated water contact results in higher peeling efficiency and better yield, but the problem of separating the food product from the superheated water in a pressure vessel have been substantial. Attempts have been made, for example, to adapt the SP-20 superheated steam peeler to one in which superheated water is used, but once the water level in the pressure drum reaches the discharge valve, discharge of superheated water from the pressure vessel impairs vacuum peeling. If the SP-20 superheated steam peeler is filled with superheated water to a level just below the discharge valve, the volume of superheated water will not be sufficient to fully submerge most of the food product, and peeling efficiency is only slightly better if the apparatus is operated as a steam peeler.

DISCLOSURE OF INVENTION

The apparatus for removing skins from a food product having skins, such as a tomato, of the present invention comprises, briefly, a pressure vessel formed to contain a volume of water in a superheated state for immersion of a volume of fruit into the water; a discharge valve positioned for receipt and discharge of superheated water and fruit together from the pressure vessel to the valve. The discharge valve is further formed for separation of the superheated water from the food product for discharge of the food product apart from the water into a skin removal device. The skin removal device receives discharged, separated food product from the discharge valve of the present invention, and most preferably but not necessarily, the skin removal device is provided as a rotary valve formed to progressively expose the food product to superheated steam and thereafter vacuum. Further peeling by cable peelers or rubber cord scrubbers, pinch rollers and the like also can be provided.

In the preferred form, the present discharge valve also is a rotary valve which moves the food product from a station at which the valve receives the food product in the superheated water to a station at which the water is separated, preferably by employing a slight pressure difference between the discharge valve and a water-receiving reservoir, as well as gravitation of the water away from the food product while the food product is supported in the valve. Finally, the valve moves the food product to a discharge station at which the food product is discharged from the valve into the peeling device. The separated superheated water can be heated, filtered and then pumped back into the pressure vessel.

The present invention also includes a discharge valve which can be retrofit to existing superheated steam peelers so as to enable their conversion to superheated water peelers. Thus, the present discharge valve comprises, a valve body formed for positioning relative to a pressure vessel for receipt of superheated water and food product therefrom. The valve is formed for separation of the water from the food product while the food product is contained in the valve and is formed to thereafter discharge the separated food product from the valve for subsequent peeling, for example, for vacuum peeling. A pocketed rotary valve having a separation station formed with a perforated wall for discharged water from the pockets while the food product remains in the pockets is particularly well suited for this purpose.

In a final aspect of the present invention, a method of removing skins from a food product is provided which includes the steps of immersing the food product having skins in a volume of superheated water in a pressure vessel for a time sufficient to loosen skins; removing the food product with loosened skins and a portion of the superheated water from the pressure vessel; thereafter, separating the food product and the superheated water; and after the separating step, removing the skins from the food product. The removing step may be accomplished by applying steam to increase pressure in the skin removal device and then applying a vacuum to separate or flash the loosened skins from the food product.

Other features of the present invention will become apparent from the following description of the Best Mode of Carrying Out the Invention, when read in conjunction with the accompanying drawing and claims, which are incorporated herein as a part of the disclosure of the invention.

BRIEF DESCRIPTION OF THE DRAWING

The drawing is a schematic, side elevation view, partially in section, of a two-stage steam peeler which has been retrofit with a discharge valve and associated apparatus constructed in accordance with the present invention.

BEST MODE OF CARRYING OUT THE INVENTION

The details of construction of a preferred embodiment of the present invention will now be set forth. It will be understood that the described embodiment is not intended to limit the invention and, on the contrary, the invention is intended to cover alternatives, modifications and equivalents, which may be included within the spirit and scope of the invention, as defined by the appended claims.

Referring now to the figure, a superheated steam peeler as shown and described in more detail in U.S. Pat. No. 6,056,987, which is incorporated herein by reference, is shown. The steam peeler has been retrofitted with the discharge valve assembly of the present invention. The drawing illustrates only the in-feed and pressure vessel portion of the steam peeler of the '987 patent, and it will be understood that this apparatus typically would be used with known auxiliary peeling devices, such as, flexible cable peelers or rubber cord scrubbers and pinch roller assemblies, which complete the peeling process by removing tags and peel segments not removed by the superheated water peeler as illustrated.

The two-stage superheated steam peeler, which has been retrofit to be a superheated water peeler, will only be briefly described herein and further details can be found in the '987 patent. An elevator conveyor, generally designated 10, delivers food product 11 having skins, such as fruit or produce, from an input station 27 to an inlet or in-feed valve assembly 12. Housing 26 encloses a first stage steam heating assembly (not shown) in which steam is directed onto food product 11 so as to preheat them before entry into inlet valve 12 and thereafter into pressure vessel or steam chamber 14. The pressure vessel can be seen to be an inclined drum, which is preferably inclined at about 5° from the horizontal so as to elevate the outlet or discharge end 15 of the drum relative to the inlet end 19 so that condensate does not exit the pressure vessel through the discharge value. A drain 17 would typically be provided at the lower end 19 of the drum for periodic draining away of the steam condensate to prevent water discharge with the food product.

Mounted in drum 14 will be an elongated cylindrical housing 32 which encloses an elongated, variable speed, flighted auger 33. Auger 33 receives food product from inlet valve 12 and conveys the same from input end 19 to discharge end 15 of pressure vessel 14 so that the food product can be exposed to superheated steam in order to loosen the skins for subsequent peeling.

Heat transfer from the superheated steam to the food product, however, in pressure vessel 14 of prior art steam peelers is not as effective or efficient as is the case when the food product is actually immersed in superheated water. Accordingly, in the present invention, pressure vessel 14 is not used primarily to contain superheated steam, but instead, contains a substantial volume of superheated water 41. Most preferably, the pressure vessel is filled with water and food product to between about one-quarter and about three-quarters of the total volume of the pressure vessel.

As will be seen, therefore, inlet or in-feed valve 12 may advantageously take the form of a rotary valve having a plurality of vanes or fins 30 which define pockets 31 therebetween. An inlet opening 42 receives food product, such as tomatoes, from elevator 10 into pockets 31. As the inlet valve rotates in the direction of arrow 43, tomatoes are discharged at opening or station 44 into an inlet conduit 46 to pressure vessel 14. Conduit 46 discharges the tomatoes onto a chute or ramp 47, which guides the tomatoes to the interior of rotating cylinder 32 and to auger 33.

It should be noted that the vanes 30 of the inlet valve seal each pocket 31 as it rotates across opening 44 so that pressure inside pressure vessel 14 is not lost to a degree sufficient to lower the temperature of the water below a superheated state. As above described, the inlet apparatus is the same as employed in the two-stage steam peeler of U.S. Pat. No. 6,056,987.

As the food product slides down chute 47 in the present apparatus, however, it enters into, and is immersed in, superheated water 41. Auger 33 conveys the food product axially along the pressure vessel 14 to discharge end 15, and in the process, the food product is substantially constantly immersed in the superheated water. Obviously, it is desirable that the volume of food product placed in the pressure vessel should not be so large as to cause some food product to be above the water line and in the superheated steam above the water for significant periods of time, since that will reduce peeling efficiency to that of a superheated steam peeler.

This would not be disastrous, but it would not maximize efficiency.

Once the food product reaches discharge end 15 of pressure vessel 14, it is urged out of end 48 of the auger assembly and gravitates and is forced downwardly toward a discharge valve 51 constructed in accordance with the present invention. Valve 51 can be seen to preferably be formed as a rotary valve which is positioned to receive food product and superheated water from the pressure vessel. This can be done by attaching valve 51 to a discharge conduit 52 from the pressure vessel at flange 53 or by monolithically forming the valve with the pressure vessel. Conduit 52 opens to the interior pressure vessel 14 and both food product and superheated water are free to gravitate down into valve 51 and/or to be forced or urged by pressure inside the pressure vessel into empty pockets 56 in the discharge valve.

The discharge valve is preferably a rotary valve, as was inlet valve 12. While a rotary valve is described in detail, a three-position, linear slide valve also could be employed. The rotary valve, however, preferably includes a plurality of vanes or fins 54 which define pockets 56 therebetween. Each of the vanes or fins seals against the valve housing so that a pocket 56 positioned to receive food product and superheated water from conduit 52 will not allow the pressure in vessel 14 to drive food product and/or water through the valve to an extent significantly lowering the elevated pressure inside vessel 14.

Discharge valve 51 is formed for receipt of superheated water and food product together from the pressure vessel and further is formed for separation of superheated water 41 from food product 11 so that the separated food product can be discharged to a skin removal device, generally designated 61. Thus, discharge valve 51 preferably includes a food product receiving position or station 60, a water separating position or station 62 and a food product discharge position or station 66. Receiving station 60 is the opening at which conduit 52 discharges food product and superheated water into a pocket 56 positioned to receive the same. Water separating position or station 62 is at a rotated position which is sufficiently far away from receiving station 60 so that at least one vane 54 is sealably engaged with the valve housing or body 63 between stations 60 and 62. This prevents pressure inside vessel 14 and the pocket at receiving station 60 from driving water under pressure directly out water separation station 62.

Water in the pockets between receiving station 60 and water separation station 62 will be pressurized. Thus, at water separation station 62, the valve housing wall can be perforated or formed with openings 64 that permit water to flow by differential pressure away from the food product while the food product is supported in pocket 56 inside the valve housing. Pressure vessel 14 and pocket 56 and receiving station 60 might typically be operated at a gauge pressure which is 2 or 3 psi higher than the pressure inside reservoir 71 and conduit 72. This pressure differential, as well as gravity, will cause the superheated water in pockets 56 to flow quickly away from the food product when the pockets reach separation station 62.

Food product discharge station 66 is located further around the circumference of the housing and allows food product to gravitate out conduit 67 to a peeling device 61. As the discharge valve rotates from the discharge station 66, in the direction of arrow 68, an unpressurized empty pocket 56 is rotated in front of conduit 52. When the empty pocket reaches conduit 52, both gravity and the pressure inside vessel 14 urge the next batch of superheated water and food product into the pocket.

Since it is contemplated in the system of the present invention that a small portion of superheated water 41 inside vessel 14 will be continuously discharged out through valve 51, and then separated from the food product, it is preferable that the apparatus of the present invention include a water collection reservoir 71 positioned to receive superheated water from discharge valve 51. This can be accomplished by means of a conduit 72 which is coupled to discharge valve 51 at water separating station 62. Conduit 72 may extend laterally at 75 by an amount clearing conveyor 91. A pump 74 may be fluid coupled by conduit 76 to pump water from collection reservoir 71 back to pressure vessel 14. Most preferably, a filter 73 is interposed between reservoir 71 and pump 74 so that the returning water will be relatively free of skin material and food product tissue. A steam injector or heating assembly 77 can be coupled to reservoir 74 so as to heat water being recycled or pumped from reservoir 71 back to pressure vessel 14. Steam injector 77 raises the water temperature to a superheated state, or at least elevates the water temperature sufficiently so that steam injectors (not shown) inside pressure vessel 14 can more easily maintain water 41 in vessel 14 at superheated temperatures. Other forms of heating assemblies could be positioned in reservoir 71. Alternatively, recycled water could be heated solely using steam injectors in the pressure vessel.

Discharge valve assembly 51 has been described in connection with a retrofit of a steam peeler. It will be understood, however, that the present discharge valve assembly also can be used with pressure vessels which are not originally intended for steam peeling. Thus, drum or pressure vessel 14 need not be inclined, since inclination is only required in superheated steam peelers to keep condensate from exiting the discharge valve. Pressure vessel 14 also does not need to take the form of a horizontal cylinder or drum. Moreover, various stirring and/or conveying apparatus can be provided inside the pressure vessel other than an auger assembly.

As will be understood from the above description, therefore, the method of the present invention for removing skins from food product can be seen to include the step of immersing food product having skins in a volume of superheated water in a pressure vessel for a time sufficient to loosen the skins on the food product. This step is followed by removing food product with loosened skins and a portion of the superheated water together from the pressure vessel through a discharge valve. Thereafter, the step of separating the food product and the superheated water is performed and, after the separating step, the step of peeling at least a portion of the loosened skins from the food product can be undertaken. This process is most preferably performed with tomatoes, and the separating step preferably occurs in the discharge valve. The peeling step will occur after the separating step and as will be described below, most preferably by applying steam and then vacuum to the tomatoes.

Accordingly, the present invention contemplates both a discharge valve 51, which can be retrofit to a pressure vessel, as well as a combination of pressure vessel 14 and discharge valve 51, and a method of removing skins from a food product having skins.

Various forms of skin removal devices can be mounted to discharge station 66 of discharge valve 51 so as to receive the food product for skin removal. As illustrated in the drawing, a preferred form a skin removal device, which is particularly well suited for use with tomatoes, is a rotary valve 61 which has a receiving station 81 that is coupled to conduit 67 from the discharge valve 51. As rotary skin removal valve 61 is rotated in the direction of arrow 82, pockets 83 defined by vanes or fins 84 in the valve sequentially rotate in front of a steam injection conduit 86 and then to vacuum conduits 87 and 88. The tomatoes then exit skin removal device 61 at discharge station 89 and are deposited onto a conveyor 91. Conveyor 91 moves the food product onto fruit elevator 92, which can convey the same to rubber cord scrubber flexible cable peelers and/or pinch rollers, as are well known in the art and shown, for example, in U.S. Pat. No. 6,056,987.

Optionally, steam can also be injected through conduit (not shown) into the peeling device 61 in advance of inlet station 81 so as to further expose the tomatoes to skin loosening steam. As the food product is rotated in pockets 83 from the steam injection conduit 86 to the vacuum conduits 87 and 88, the moisture underneath the loosened skin flashes, and a substantial portion of the loosened skin is thereby removed from the tomato. The removed skin is carried down conduits 87 and 88 leaving the meat or tissue of the tomato or food product, with small skin tags or skin portions still attached. The tags are removed by the subsequent skin peeling pinch rollers and/or cable peelers.

It will be understood that while skin peeling device 61 is preferred for use with the superheated water peeler and discharge valve assembly 51, other forms of skin peeling devices can be employed in combination with the apparatus of the present invention. Vacuum skin removal, however, is particularly well suited for use with tomatoes, which have had their skins loosened.

Accordingly, the apparatus and method of the present invention allow existing superheated steam peelers to be converted to superheated water peelers by providing a discharge valve which allows a portion of the water in the pressure vessel to escape with the food product and thereafter be separated for subsequent peeling of the food product skins. The discharge valve also can be used with pressure vessels which are designed specifically to contain superheated water. The method of the present invention allows superheated water-based peeling of food product by providing a relatively simple discharge valve assembly which can accept both water from the pressure vessel and food product, and which will separate the water from the food product prior to peeling.

What is claimed is:

1. A method of removing skins from a food product having a skin comprising the steps of:

immersing said food product having skins in a volume of superheated water in a pressure vessel for a time sufficient to loosen skins on said food product;

removing food product with loosened skins and a portion of the superheated water together from the pressure vessel;

thereafter separating the food product and the superheated water; and after said separating step, peeling at least a portion of the loosened skins from the food product.

2. The method as defined in claim 1 wherein, the food product is a tomato;

said removing step is accomplished by discharging the tomato and the portion of the superheated water from said pressure vessel through a discharge valve; and said separating step occurs in said discharge valve while substantially maintaining an elevated pressure inside said pressure vessel.

3. The method as defined in claim 2 wherein, said peeling step occurs after discharge of said tomato from said discharge valve and is accomplished in part by applying a vacuum to the tomato.

* * * * *